(12) United States Patent
Nakamura et al.

(10) Patent No.: US 10,850,559 B2
(45) Date of Patent: Dec. 1, 2020

(54) DRIVING DEVICE FOR CARRIAGE

(71) Applicant: NABTESCO CORPORATION, Tokyo (JP)

(72) Inventors: Koji Nakamura, Tsu (JP); Osamu Ochiai, Tsu (JP); Kenya Tomiyasu, Tsu (JP)

(73) Assignee: NABTESCO CORPORATION, Tokyo (JP)

( * ) Notice: Subject to any disclaimer, the term of this patent is extended or adjusted under 35 U.S.C. 154(b) by 37 days.

(21) Appl. No.: 15/892,518

(22) Filed: Feb. 9, 2018

(65) Prior Publication Data
US 2018/0229549 A1 Aug. 16, 2018

(30) Foreign Application Priority Data
Feb. 15, 2017 (JP) .................. 2017-026352

(51) Int. Cl.
| | | |
|---|---|---|
| *B60B 19/00* | (2006.01) | |
| *B60B 27/00* | (2006.01) | |
| *B60K 17/04* | (2006.01) | |
| *B60B 35/14* | (2006.01) | |
| *B60K 7/00* | (2006.01) | |

(52) U.S. Cl.
CPC ........ *B60B 27/0015* (2013.01); *B60B 19/003* (2013.01); *B60B 27/0021* (2013.01); *B60B 35/14* (2013.01); *B60K 7/0007* (2013.01); *B60K 17/043* (2013.01); *B60K 17/046* (2013.01);
(Continued)

(58) Field of Classification Search
CPC ............... B60K 17/043; B60K 17/046; B60K 2007/0038; B60K 2007/0092; B60K 7/0007; B60B 19/003
See application file for complete search history.

(56) References Cited

U.S. PATENT DOCUMENTS

| | | | | |
|---|---|---|---|---|
| 5,551,349 A | * | 9/1996 | Bodzin | ................. B60B 19/125 104/138.2 |
| 6,537,167 B1 | * | 3/2003 | Gazyakan | ............ B60K 7/0007 180/372 |

(Continued)

FOREIGN PATENT DOCUMENTS

| | | |
|---|---|---|
| CN | 101659205 A | 3/2010 |
| CN | 101659287 A | 3/2010 |

(Continued)

OTHER PUBLICATIONS

Machine translation of CN201494299U; Wang; Jun. 2, 2010; retrieved from ESpacenet Jun. 18, 2019.*

(Continued)

*Primary Examiner* — Emma K Frick
(74) *Attorney, Agent, or Firm* — Pillsbury Winthrop Shaw Pittman, LLP

(57) ABSTRACT

A driving device for a carriage includes a motor, a speed reducer, and a mecanum wheel. The speed reducer decelerates the power input from the motor and outputs a decelerated power. The mecanum wheel is rotated by the decelerated power output from the speed reducer. The speed reducer includes a speed reducing unit, a carrier, and a case. The speed reducing unit receives the power from the motor. The carrier supports the speed reducing unit. The case is rotatable relative to the carrier. The mecanum wheel is fixed on the case or the carrier.

5 Claims, 3 Drawing Sheets

(52) U.S. Cl.
CPC .............. *B60K 2007/0038* (2013.01); *B60K 2007/0092* (2013.01)

(56) References Cited

U.S. PATENT DOCUMENTS

| | | | | |
|---|---|---|---|---|
| 6,661,137 | B2* | 12/2003 | Gauthier | B60K 7/0007 |
| | | | | 310/156.01 |
| 8,499,865 | B2* | 8/2013 | Takenaka | B60B 19/003 |
| | | | | 180/21 |
| 8,708,068 | B2* | 4/2014 | Yada | B60B 19/12 |
| | | | | 180/7.1 |
| 9,017,198 | B2* | 4/2015 | Hoebel | F16H 49/001 |
| | | | | 474/139 |
| 9,216,612 | B2* | 12/2015 | Zdrahal | B60B 11/02 |
| 9,415,630 | B2* | 8/2016 | Yoshino | B60B 19/003 |
| 9,511,661 | B2* | 12/2016 | Brownell | B60K 17/046 |
| 9,864,396 | B1* | 1/2018 | Brown | A01D 34/006 |
| 10,406,854 | B2* | 9/2019 | Zhang | B60B 19/003 |
| 2008/0169141 | A1 | 7/2008 | Suzuki | |
| 2017/0361648 | A1* | 12/2017 | McKinnon | B60B 19/12 |
| 2018/0065478 | A1* | 3/2018 | Ruscak | B60K 7/00 |
| 2018/0162478 | A1* | 6/2018 | Silverwood | B60B 19/003 |
| 2018/0180137 | A1* | 6/2018 | Watanabe | B60K 7/00 |
| 2018/0236813 | A1* | 8/2018 | Ochiai | B60B 11/02 |
| 2018/0297396 | A1* | 10/2018 | Dietrich | B60K 7/0007 |
| 2018/0361849 | A1* | 12/2018 | Honkanen | F16C 33/581 |
| 2019/0084364 | A1* | 3/2019 | Lagrandcourt | B62D 61/00 |
| 2019/0285144 | A1* | 9/2019 | Yamagishi | F16H 57/02 |
| 2019/0389265 | A1* | 12/2019 | Bartlett | B60G 11/27 |
| 2020/0094617 | A1* | 3/2020 | Wang | B60B 19/003 |
| 2020/0156459 | A1* | 5/2020 | Henningsgard | B60L 53/50 |

FOREIGN PATENT DOCUMENTS

| | | | |
|---|---|---|---|
| CN | 201494299 | U | 6/2010 |
| CN | 202091435 | U | 12/2011 |
| CN | 103182900 | A | 7/2013 |
| CN | 103231623 | A | 8/2013 |
| CN | 106364259 | * | 2/2017 |
| JP | 58-039316 | U | 3/1983 |
| JP | 2014-526419 | A | 10/2014 |
| JP | 2015-083440 | A | 4/2015 |

OTHER PUBLICATIONS

Office Action dated Jan. 28, 2019 issued in corresponding German Patent Application No. 10 2018 202 030.2 with English translation.
Notice of Reasons for Refusal dated Sep. 8, 2020 issued in corresponding Japanese Patent Application No. 2017-026352 w/English translation (7 pages).

* cited by examiner

DRIVING DEVICE FOR CARRIAGE

CROSS-REFERENCE TO RELATED APPLICATIONS

This application is based on and claims the benefit of priority from Japanese Patent Application Serial No. 2017-026352 (filed on Feb. 15, 2017), the contents of which are hereby incorporated by reference in their entirety.

TECHNICAL FIELD

The present invention relates to a driving device for a carriage.

BACKGROUND

Mecanum wheels are known as traveling wheels. A mecanum wheel includes a wheel body and a plurality of rollers rotatably mounted on the outer periphery of the wheel body. Each of the rollers is supported on the wheel body so as to be rotatable around a rotation axis oblique to the rotation axis of the wheel body. A mecanum wheel having such a distinctive structure can be used as a traveling wheel of a carriage, so as to fabricate a carriage that can move in directions other than the font-rear direction of a carriage body.

However, because of the complex construction and movement, a mecanum wheel is subjected to loads in a complex manner. In particular, it is predicted that a mecanum wheel is subjected to loads in a plurality of directions. Designing and manufacturing a mecanum wheel that withstands such loads have been considered to be complicated and difficult. As a result, carriages including a mecanum wheel are not used widely.

SUMMARY

The present invention addresses the above problem, and one object thereof is to provide a driving device for a carriage including a mecanum wheel. A driving device for a carriage according to the present invention comprises: a motor; a speed reducer that decelerates power input from the motor and outputs a decelerated power; and a mecanum wheel to be rotated by the decelerated power output from the speed reducer, wherein the speed reducer includes a speed reducing unit that receives the power from the motor, a carrier that supports the speed reducing unit, and a case rotatable relative to the carrier, and the mecanum wheel is fixed on the case or the carrier.

It is also possible that the speed reducer further includes a pair of bearings disposed between the carrier and the case, and the pair of bearings receive both a thrust load and a radial load between the carrier and the case.

It is also possible that at least a part of the speed reducer is disposed inside the mecanum wheel in radial directions from a rotation axis of the mecanum wheel.

It is also possible that the case of the speed reducer is press-fitted into the mecanum wheel.

It is also possible that the speed reducer further includes a pair of bearings disposed between the carrier and the case, at least a part of the speed reducer is disposed inside the mecanum wheel in radial directions from a rotation axis of the mecanum wheel, and at least a part of the mecanum wheel is positioned between load centers of the pair of bearings in an axial direction parallel to the rotation axis of the mecanum wheel.

It is also possible that the speed reducer further includes a pair of bearings disposed between the carrier and the case, at least a part of the speed reducer is disposed inside the mecanum wheel in radial directions from a rotation axis of the mecanum wheel, and a center of the mecanum wheel corresponds to a center of load centers of the pair of bearings in an axial direction parallel to the rotation axis of the mecanum wheel.

It is also possible that the speed reducer further includes a pair of bearings disposed between the carrier and the case, and the pair of bearings are cylindrical roller bearings having rolling elements that are rotatable around an axis parallel to a rotation axis of the mecanum wheel.

According to the present invention, a driving device for a carriage including a mecanum wheel can be provided with a sufficient strength.

DESCRIPTION OF THE PREFERRED EMBODIMENTS

Figure 1:
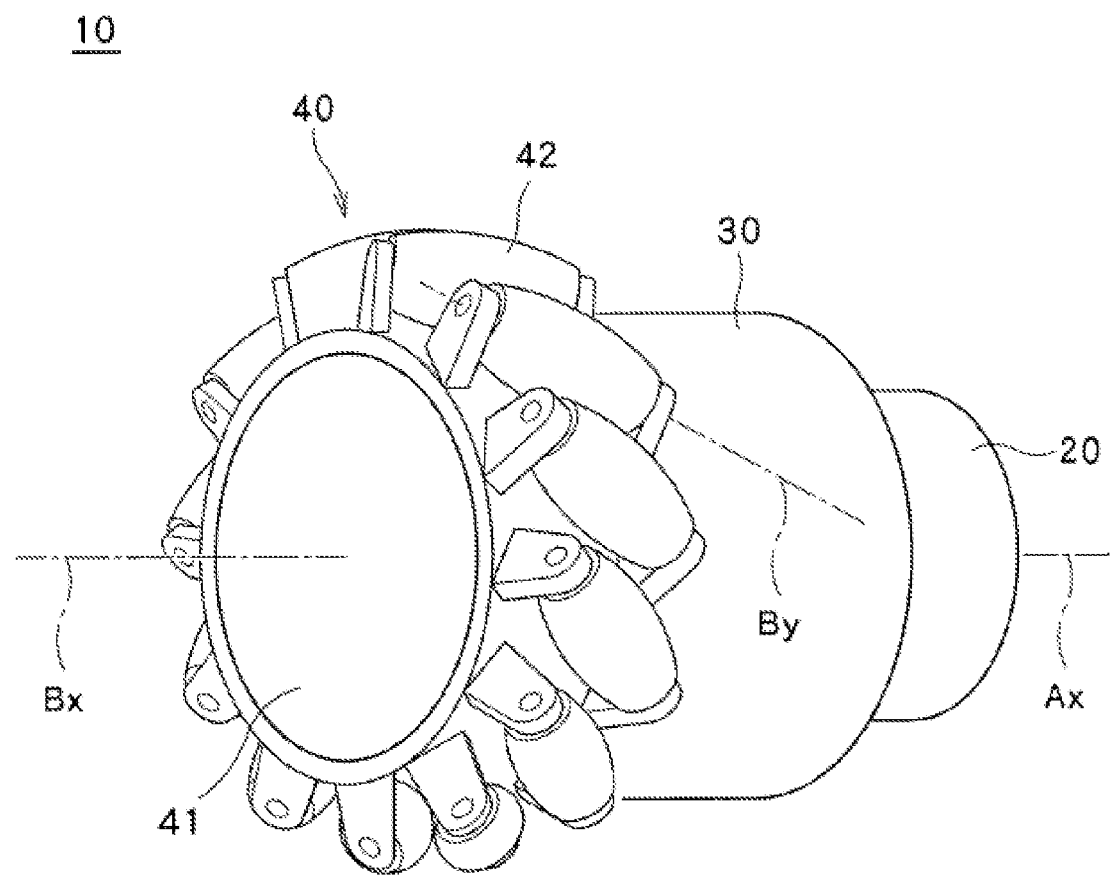
FIG. 1 is a schematic perspective view of a driving device for a carriage, according to a first embodiment of the present invention.

The first embodiment of the present invention will now be described with reference to the attached drawings. The accompanying drawings are simplified and the elements in the drawings are not necessarily drawn to scale, and the dimensional ratio between the elements and shapes of the elements may be different from the actual ones. However, from such simplified drawings, the embodiments described below and other embodiments of the present invention would be sufficiently understood by those skilled in the art.

First Embodiment

Figure 2:
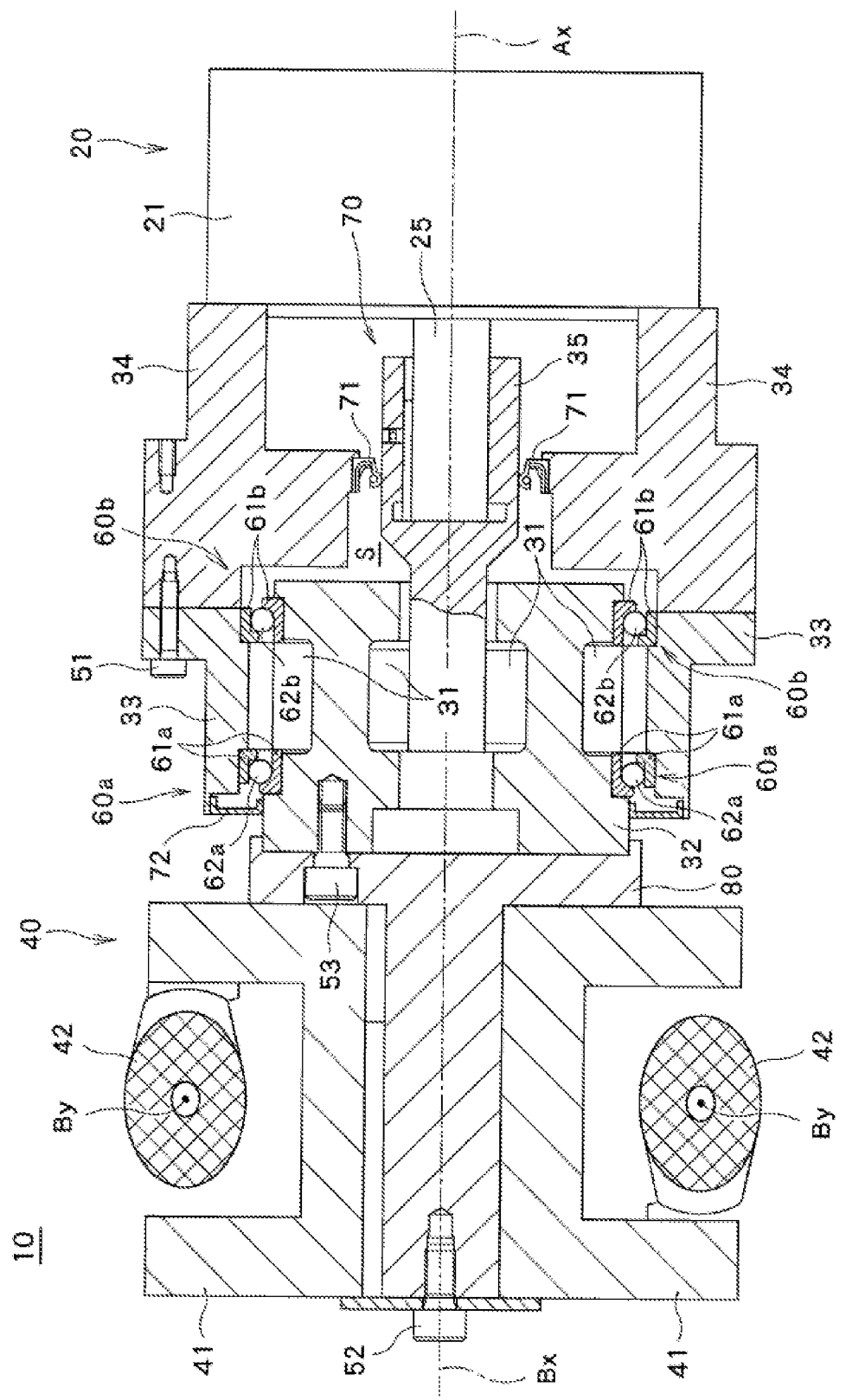
FIG. 2 is a sectional view of the driving device shown in FIG. 1 along the rotation axis thereof.

FIG. 1 is a perspective view of a driving device for a carriage, according to a first embodiment of the present invention. FIG. 2 is a sectional view of a motor of the driving device shown in FIG. 1 along the rotation axis thereof.

As shown in FIG. 1 and FIG. 2, the driving device 10 includes a motor 20, a speed reducer 30, and a mecanum wheel 40. The speed reducer 30 decelerates the power (i.e., rotation) input from the motor 20 and outputs the decelerated power. The mecanum wheel 40 is rotated by the output from the speed reducer 30.

As shown in FIG. 2, the speed reducer 30 includes a speed reducing unit 31, a carrier 32, and a case 33. The speed reducing unit 31 receives the power (rotation) from the motor 20. The carrier 32 supports the speed reducing unit 31. The case 33 is capable of moving relative to the carrier 32. In the example shown in FIG. 2, the speed reducer 30 further includes a base 34 that supports the motor 20.

The case 33 and the base 34 have a substantially cylindrical shape and extend in the direction of the rotation axis Ax of the motor 20. A body 21 of the motor 20 is mounted on one end of the base 34 via a fastening member (not shown). On the other end of the base 34, there is fixed one end of the case 33 via a fastening member 51 such as a bolt.

Inside the case 33 and the base 34 in the radial directions from the rotation axis Ax, there is provided an input shaft 35 that extends in the direction of the rotation axis Ax. Further, inside the case 33 in the radial directions from the rotation axis Ax, there are provided the speed reducing unit 31 and the carrier 32.

The input shaft 35 serves as an input gear that inputs power from the motor 20 to the speed reducing unit 31. More specifically, one end of the input shaft 35 is connected to an output shaft 25 of the motor 20. This enables the input shaft 35 to rotate around the rotation axis Ax integrally with the output shaft 25 of the motor 20. Thus, the power (rotation) output from the motor 20 is transmitted to the input shaft 35. The input shaft 35 inputs, at the other end thereof, the power from the motor 20 to the speed reducing unit 31.

The body 21 and the output shaft 25 of the motor 20 are removably mounted on the base 34 and the input shaft 35, respectively. Therefore, the motor 20 can be replaced when necessary.

The speed reducing unit 31 decelerates power (rotation) that is input from the input shaft 35 and transmits the power with an increased torque to the carrier 32 or the case 33. In the example shown in FIG. 2, the case 33 is fixed on the base 34, and therefore, the speed reducing unit 31 transmits the power to the carrier 32 to rotate the carrier 32.

In the example shown in FIG. 2, the speed reducer 30 is configured as an eccentric oscillating speed reducer, and the speed reducing unit 31 constitutes an eccentric oscillating gear. An eccentric oscillating speed reducer typically has a small backlash that makes it possible to reduce malfunctions of the whole driving device 10. The speed reducer 30 is not limited to an eccentric oscillating speed reducer but may be other types of speed reducers. For example, the speed reducer 30 may be a planetary gear speed reducer or may be constituted by a speed reducing structure in which a planetary gear speed reducer and an eccentric oscillating speed reducer are combined together. Alternatively, the speed reducer 30 may be constituted by other desired types of speed reducing structures. When the speed reducer 30 is a planetary gear speed reducer, the speed reducing unit 31 constitutes a planetary gear.

The carrier 32 retains the speed reducing unit 31. Further, the carrier 32 is connected to the case 33 via a pair of bearings 60a, 60b disposed between the carrier 32 and the case 33, so as to be rotatable relative to the case 33. In the example shown in FIG. 2, the speed reducing unit 31 meshes with the case 33 fixed stationary, and therefore, the carrier 32 rotates around the rotation axis Ax at a reduced rotation speed along with the speed reducing unit 31. The carrier 32 is also restrained by the pair of bearings 60a, 60b from moving in the direction of the rotation axis Ax relative to the case 33.

The pair of bearings 60a, 60b also withstand the loads imparted to the carrier 32 and the case 33. When the carriage includes a mecanum wheel, a thrust load and a radial load may be imparted to the carrier 32 and the case 33 from the mecanum wheel. The thrust direction mentioned herein refers to the direction in which the rotation axis Ax extends. The radial direction mentioned herein refers to the radial directions from the rotation axis Ax. The pair of bearings 60a, 60b can receive both the thrust load and the radial load between the carrier 32 and the case 33. Since the pair of bearings 60a, 60b thus configured are disposed between the carrier 32 and the case 33, the thrust load and the radial load are prevented from being transmitted to components of the speed reducer 30 such as the speed reducing unit 31. As a result, the life span of the speed reducer 30 can be elongated.

In the example shown in FIG. 2, the bearings 60a, 60b are angular ball bearings each including track rings 61a, 61b and arrays of spherical rolling elements 62a, 62b enclosed between the track rings 61a, 61b.

The pair of bearings 60a, 60b are not limited to angular ball bearings but may be other types of bearings. For example, the pair of bearings 60a, 60b may be cylindrical roller bearings having rolling elements that are rotatable around an axis parallel to the rotation axis Bx of the mecanum wheel 40 described later. In this case, the pair of bearings 60a, 60b can receive at least the radial load. As a result, the radial load is prevented from being transmitted to components of the speed reducer 30 such as the speed reducing unit. As a result, the life span of the speed reducer 30 can be elongated. In an example described later in which the speed reducer 30 is disposed inside the mecanum wheel 40, the thrust load imparted to the elements constituting the speed reducer 30 is small, while the radial load imparted to the same is large. Therefore, a cylindrical roller bearing is suitable since it has rolling elements that are rotatable around an axis parallel to the rotation axis Bx of the mecanum wheel 40.

On the other end of the carrier 32, there is fixed a connector 80 via a fastening member 53 such as a bolt. The connector 80 connects the mecanum wheel 40 to the carrier 32. A wheel body 41 of the mecanum wheel 40 described later is fixed to the connector 80 via a fastening member 52 such as a bolt. The connector 80 is designed to the dimensions of the mecanum wheel 40 and the speed reducer 30 so as not to have an unnecessary clearance formed between the mecanum wheel 40 and the speed reducer 30. The connector 80 is also designed in consideration of the size and direction of the load imparted to the mecanum wheel 40 during traveling of the carriage, so as to have a strength enough to withstand the load. Naturally, the speed reducer 30 and the fastening member 53 for fixing the connector 80 to the speed reducer 30 are also designed in consideration of the dimensions of the mecanum wheel 40 and the size and direction of the load imparted to the mecanum wheel 40. That is, in this embodiment, the whole driving device 10 is designed in consideration of the size and direction of the load imparted to the mecanum wheel 40.

The internal space S surrounded by the base 34, the case 33, and the carrier 32 is sealed by a seal portion 70. The seal portion 70 in the embodiment includes a first seal element 71 that seals between the base 34 and the input shaft 35, and a second seal element 72 that seals between the case 33 and the carrier 32. The speed reducing unit 31 and the bearings 60a, 60b are disposed in the internal space S sealed and closed by the seal portion 70.

Next, the mecanum wheel will be described.

As shown in FIG. 1, the mecanum wheel 40 includes a wheel body 41 and a plurality of barrel-shaped rollers 42 rotatably mounted on the periphery of the wheel body 41. Each of the rollers 42 is supported on the wheel body 41 so as to be rotatable around a rotation axis By oblique to the rotation axis Bx of the wheel body 41. The rotation axis By of the rollers 42 extends at an angle of about 45° with respect to the rotation axis Bx of the mecanum wheel 40.

In the example shown in FIG. 2, the mecanum wheel 40 is fixed on the connector 80 of the carrier 32 such that rotation axis Bx of the mecanum wheel 40 is aligned with the rotation axis Ax of the carrier 32. When the speed reducing unit 31 is configured to rotate the case 33 as in an example described later, the mecanum wheel 40 may be fixed on the case 33 so as to rotate along with the case 33.

The driving device 10 thus configured is mounted on a carriage body (not shown) to construct a carriage. It should be noted that the driving device 10 is applicable to all kinds of carriages in which power from the motor 20 is transmitted to the wheel 40 via the speed reducer 30. For example, the driving device 10 of the invention can be applied not only to carriages that require assistance by an operator during traveling but also to carriages (i.e., an unmanned conveyance vehicle) such as AGVs (Automatic Guided Vehicles) or RGVs (Rail Guided Vehicles) that do not require assistance by an operator during traveling.

As described above, the driving device 10 for a carriage according to the first embodiment includes a motor 20, a speed reducer 30, and a mecanum wheel 40. The speed reducer 30 decelerates the power input from the motor 20 and outputs the decelerated power. The mecanum wheel 40 is rotated by the output from the speed reducer 30. The speed reducer 30 includes a speed reducing unit 31, a carrier 32, and a case 33. The speed reducing unit 31 receives the power from the motor 20. The carrier 32 supports the speed reducing unit 31. The case 33 is rotatable relative to the carrier 32. The mecanum wheel 40 is fixed on the case 33 or the carrier 32.

In this driving device, the speed reducer 30 can be provided with a sufficient strength, and the mecanum wheel 40 can be connected to the motor 20 via the speed reducer 30. Further, speed reducers 30 having various strengths and sizes may be previously designed or prepared to significantly reduce the burden of complicated strength calculation and designing and manufacturing based on the strength calculation in application of the mecanum wheel 40. According to the embodiment, the speed reducer 30 or the whole driving device 10 can be designed in consideration of the dimensions of the mecanum wheel 40 and the size and direction of the load imparted to the mecanum wheel 40.

In the first embodiment, the speed reducer 30 further includes a pair of bearings 60a, 60b disposed between the carrier 32 and the case 33. The pair of bearings 60a, 60b receive both the thrust load and the radial load between the carrier 32 and the case 33. As a result, the thrust load and the radial load can be prevented from being transmitted to components of the speed reducer 30 such as the speed reducing unit 31. As a result, the life span of the speed reducer 30 can be elongated.

Alternatively, it is also possible that the speed reducer 30 further includes a pair of bearings 60a, 60b disposed between the carrier 32 and the case 33, and the pair of bearings 60a, 60b are cylindrical roller bearings having rolling elements that are rotatable around an axis parallel to the rotation axis Bx of the mecanum wheel 40. In this case, the pair of bearings 60a, 60b can receive the radial load.
As a result, the radial load is prevented from being transmitted to components of the speed reducer 30 such as the speed reducing unit 31. As a result, the life span of the speed reducer 30 can be elongated.

Second Embodiment

Next, the second embodiment of the present invention will now be described with reference to FIG. 3. The second embodiment is substantially the same as the first embodiment except that at least a part of the speed reducer is disposed inside the mecanum wheel and that the mecanum wheel is fixed on the case, not on the carrier. In the following description of the second embodiment, the same elements as in the first embodiment will be denoted by the same reference numerals and detailed descriptions thereof will be omitted. Further, when it is obvious that the advantages obtained in the first embodiment can also be obtained in this embodiment, the description of the advantages may be omitted.

Figure 3:
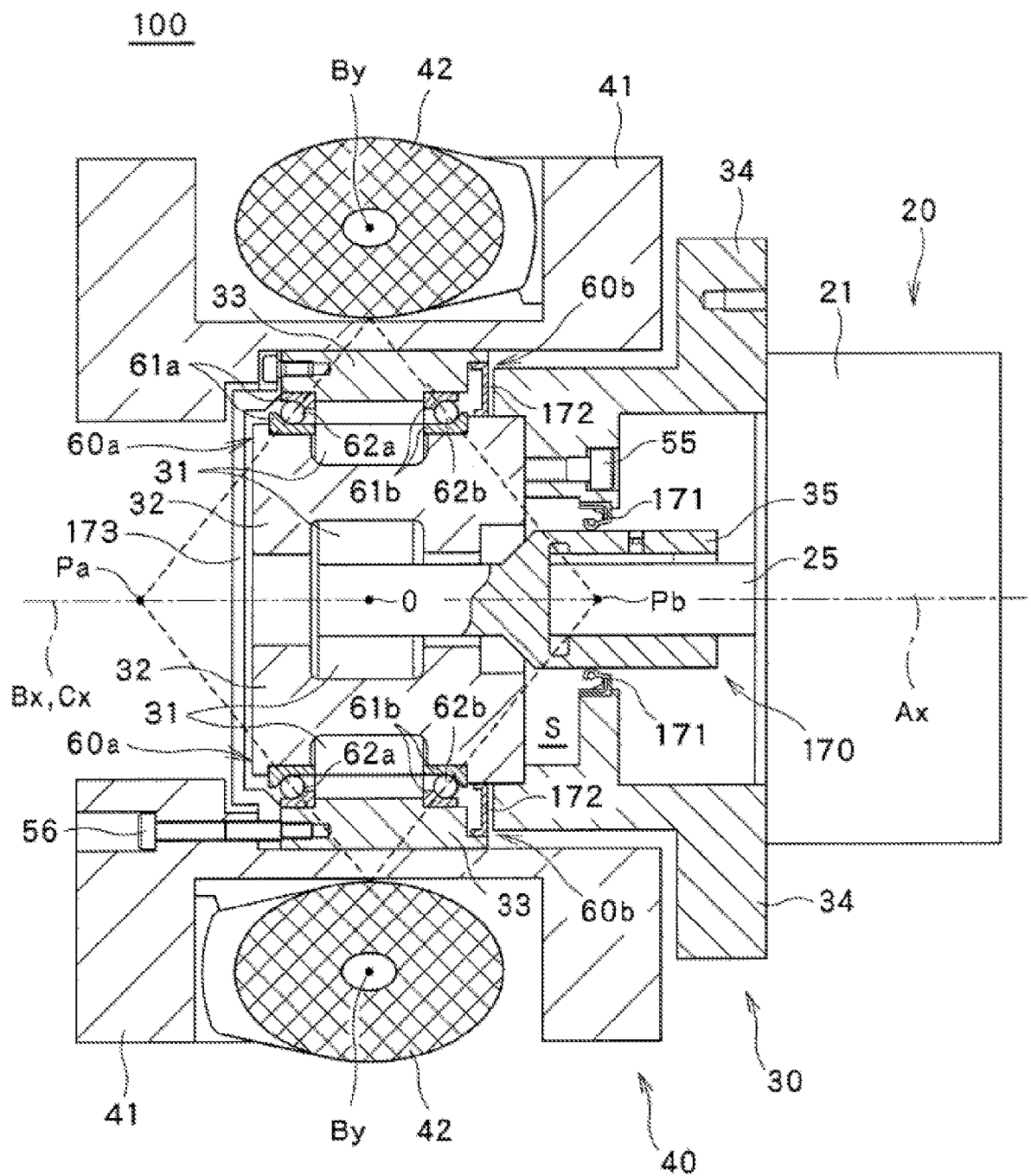
FIG. 3 is a sectional view of a driving device for a carriage along a rotation axis thereof, according to a second embodiment of the present invention.

In the driving device 100 shown in FIG. 3, the speed reducing unit 31 of the speed reducer 30 is configured to transmit power to the case 33. More specifically, in the example shown in FIG. 3, the case 33 is not fixed on the base 34, but the carrier 32 is fixed on the base 34 via a fastening member 55 such as a bolt. As a result, the speed reducing unit 31 is configured to transmit power to the case 33 so as to rotate the case 33.

Further, in the driving device 100 shown in FIG. 3, at least a part of the speed reducer 30 is disposed inside the mecanum wheel 40 in the radial directions from the rotation axis Bx of the mecanum wheel 40. In other words, at least a part of the speed reducer 30 is disposed in a region overlapping with the mecanum wheel 40 in the direction of the rotation axis Ax. More specifically, the case 33 of the speed reducer 30 is press-fitted into the mecanum wheel 40. The wheel body 41 of the mecanum wheel 40 is fixed on the case 33 via a fastening member 56 such as a bolt, and the wheel body 41 is also supported at the inner periphery thereof by the case 33. Naturally, the case 33 of the speed reducer 30 may be disposed inside the mecanum wheel 40 by a method other than press-fitting such as loose fitting.

Thus, since at least a part of the speed reducer 30 is disposed inside the mecanum wheel 40, it is possible to reduce the dimension of the driving device 100 in the direction of the rotation axis Bx. In addition, it is possible to reduce the moment of force applied from the mecanum wheel 40 to the speed reducer 30. As a result, the life span of the speed reducer 30 can be further elongated. Further, since the moment of force applied from the mecanum wheel 40 to the speed reducer 30 is reduced, it is possible to reduce the dimensions of the fastening member 56 for fixing the mecanum wheel 40 on the speed reducer 30.

In the example shown in FIG. 3, at least a part of the mecanum wheel 40 is positioned between the load center Pa of the bearing 60a and the load center Pb of the bearing 60b in the axial direction parallel to the rotation axis Bx of the mecanum wheel 40. The load centers Pa, Pb of the bearings 60a, 60b refer to the points at which the central axis Cx of the bearings 60a, 60b intersects the extensions of the vectors indicating a resultant of forces transmitted from the track rings 61a, 61b of the bearings 60a, 60b to the arrays of rolling members 62a, 62b enclosed between the track rings 61a, 61b. Since at least a part of the mecanum wheel 40 is positioned between the load center Pa of the bearing 60a and the load center Pb of the bearing 60b, it is possible to effectively reduce the moment of force applied to the speed reducer 30.

Further, in the example shown in FIG. 3, the center O of the mecanum wheel 40 corresponds to the center of the load centers Pa, Pb of the pair of bearings 60a, 60b. This makes it possible to set the moment of force applied from the mecanum wheel 40 to the speed reducer 30 at zero. As a result, the life span of the speed reducer 30 can be furthermore elongated.

In the example shown in FIG. 3, the internal space S surrounded by the base 34, the case 33, and the carrier 32 is sealed by a seal portion 170. The seal portion 170 in the embodiment includes a first seal element 171 that seals between the base 34 and the input shaft 35, a second seal element 172 that seals between the case 33 and the carrier 32, and a third seal element 173 that seals the other end of the case 33. The speed reducing unit 31 and the bearings 60a, 60b are disposed in the internal space S sealed and closed by the seal portion 170.

In the driving device 100 for a carriage according to the second embodiment described above, at least a part of the speed reducer 30 is disposed inside the mecanum wheel 40 in the radial directions from the rotation axis Bx of the mecanum wheel 40. This makes it possible to reduce the dimension of the driving device 100 in the direction of the rotation axis Bx. In addition, it is possible to reduce the moment of force applied by the mecanum wheel 40 to the speed reducer 30. As a result, the life span of the speed reducer 30 can be further elongated. Further, since the moment of force applied from the mecanum wheel 40 to the speed reducer 30 is reduced, it is possible to reduce the dimensions of the fastening member 56 for fixing the mecanum wheel 40 on the speed reducer 30.

The case 33 of the speed reducer 30 is press-fitted into the mecanum wheel 40. Thus, the wheel body 41 of the mecanum wheel 40 is supported at the inner periphery thereof by the case 33. As a result, the strength of the mecanum wheel 40 can be increased.

Further, at least a part of the mecanum wheel 40 is positioned between the load centers Pa, Pb of the pair of bearings 60a, 60b in the axial direction parallel to the rotation axis Bx of the mecanum wheel 40. This makes it possible to more effectively reduce the moment of force applied from the mecanum wheel 40 to the speed reducer 30. As a result, the life span of the speed reducer 30 can be furthermore elongated.

Further, the center O of the mecanum wheel 40 corresponds to the center of the load centers of the pair of bearings 60a, 60b in the axial direction parallel to the rotation axis Bx of the mecanum wheel 40. This makes it possible to set the moment of force applied from the mecanum wheel 40 to the speed reducer 30 at zero. As a result, the life span of the speed reducer 30 can be furthermore elongated.

The invention is not limited to the above-described embodiments and modification examples. For example, various modifications may be made to the elements of the embodiments and the modification examples described above. The invention also encompasses embodiments including components and/or methods other than the above-described components and/or methods. The invention also encompasses embodiments not including some elements of the above-described components and/or methods. Further, advantageous effects of the invention are not limited to the above-described ones, and there may be a specific effect depending on a specific configuration of each embodiment.

What is claimed is:

1. A driving device for a carriage, comprising:
   a motor;
   a speed reducer that decelerates power input from the motor and outputs a decelerated power; and
   a mecanum wheel to be rotated by the decelerated power output from the speed reducer,
   wherein the speed reducer includes
      a speed reducing unit that receives the power from the motor,
      a carrier that supports the speed reducing unit, and
      a case rotatable relative to the carrier;
   wherein the mecanum wheel is fixed on the case;
   wherein the speed reducer further includes a pair of bearings disposed between the carrier and the case and at a radially outer periphery of the speed reducing unit of the speed reducer;
   wherein at least a part of the speed reducer is disposed inside the mecanum wheel in radial directions from a rotation axis of the mecanum wheel;
   wherein a center of the mecanum wheel is positioned between load centers of the pair of bearings in an axial direction parallel to the rotation axis of the mecanum wheel; and
   wherein a center of a connection portion connecting the mecanum wheel and the case is positioned between the load centers of the pair of bearings in the axial direction parallel to the rotation axis of the mecanum wheel.

2. The driving device of claim 1, wherein the pair of bearings receive both a thrust load and a radial load between the carrier and the case.

3. The driving device of claim 1, wherein the case of the speed reducer is press-fitted into the mecanum wheel.

4. The driving device of claim 1,
   wherein a center of the mecanum wheel corresponds to a center of load centers of the pair of bearings in an axial direction parallel to the rotation axis of the mecanum wheel.

5. The driving device of claim 1, wherein the pair of bearings are cylindrical roller bearings having rolling elements that are rotatable around an axis parallel to a rotation axis of the mecanum wheel.

* * * * *